(12) United States Patent
Orihara

(10) Patent No.: US 8,059,062 B2
(45) Date of Patent: Nov. 15, 2011

(54) ANTENNA CIRCUIT AND TRANSPONDER

(75) Inventor: Katsuhisa Orihara, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 254 days.

(21) Appl. No.: 12/302,471

(22) PCT Filed: Mar. 5, 2007

(86) PCT No.: PCT/JP2007/054222
§ 371 (c)(1),
(2), (4) Date: Nov. 25, 2008

(87) PCT Pub. No.: WO2007/138770
PCT Pub. Date: Dec. 6, 2007

(65) Prior Publication Data
US 2009/0201116 A1    Aug. 13, 2009

(30) Foreign Application Priority Data

May 31, 2006  (JP) ................................. 2006-152032

(51) Int. Cl.
*H01Q 1/36* (2006.01)
(52) U.S. Cl. ......................... 343/895; 343/872; 343/909
(58) Field of Classification Search .................. 343/872, 343/715, 841, 787, 795, 778, 767, 909, 770, 343/895, 702, 713, 700 MS; 340/572.7, 340/572.1, 572.8, 572.5; 235/492
See application file for complete search history.

(56) References Cited

U.S. PATENT DOCUMENTS

| | | | |
|---|---|---|---|
| 6,181,287 B1 * | 1/2001 | Beigel | 343/741 |
| 7,209,281 B2 * | 4/2007 | Takei | 359/296 |
| 7,652,579 B2 * | 1/2010 | Keyaki et al. | 340/572.8 |
| 2004/0074974 A1 * | 4/2004 | Senba et al. | 235/492 |
| 2005/0007296 A1 * | 1/2005 | Endo et al. | 343/895 |
| 2006/0266435 A1 * | 11/2006 | Yang et al. | 148/105 |
| 2007/0252706 A1 * | 11/2007 | Furutani | 340/572.8 |
| 2008/0003457 A1 * | 1/2008 | Endo | 428/692.1 |
| 2008/0129629 A1 * | 6/2008 | Kimura et al. | 343/788 |
| 2009/0146898 A1 * | 6/2009 | Akiho et al. | 343/787 |
| 2010/0288418 A1 * | 11/2010 | Yang et al. | 156/62.2 |

FOREIGN PATENT DOCUMENTS

| | | |
|---|---|---|
| JP | 4-101168 | 4/1992 |
| JP | 08-330839 | 12/1996 |
| JP | 09-139698 | 5/1997 |
| JP | 11-238103 | 8/1999 |
| JP | 2000-505923 | 5/2000 |
| JP | 2000-196339 | 7/2000 |
| JP | 2000-278027 | 10/2000 |
| JP | 2003-157420 | 5/2003 |
| JP | 2003-215271 | 7/2003 |
| JP | 2003-331250 | 11/2003 |

(Continued)

*Primary Examiner* — Douglas W Owens
*Assistant Examiner* — Jae Kim
(74) *Attorney, Agent, or Firm* — K&L Gates LLP

(57) ABSTRACT

An antenna circuit and a transponder with the antenna circuit are provided for forming a resonant circuit. The antenna circuit includes a substrate, an antenna conductor, and a sheet metal. The antenna conductor includes an antenna coil formed in a predetermined conductor pattern on a front surface of the substrate. The sheet metal is provided on a rear surface of the substrate opposed to the front surface of the substrate and includes a slit.

7 Claims, 18 Drawing Sheets

FOREIGN PATENT DOCUMENTS

| | | |
|---|---|---|
| JP | 2005-067585 | 3/2005 |
| JP | 2005-080023 | 3/2005 |
| JP | 2005-109603 | 4/2005 |
| JP | 2005-170389 | 6/2005 |
| JP | 2006-060432 | 3/2006 |
| JP | 08-10160 | 11/2008 |
| WO | 2005/004047 | 1/2005 |

\* cited by examiner

ANTENNA CIRCUIT AND TRANSPONDER

CROSS REFERENCE TO RELATED APPLICATIONS

The present application claims priority to Japanese Patent Application No. 2006-152032 filed on May 31, 2006, the entire contents of which is being incorporated herein by reference.

BACKGROUND

Recently, a system performing individual management, or a so-called RFID (Radio Frequency Identification) system, has been attracting attention in various industries. This RFID system is a technology that reads and/or writes data without making contact with the transponder by radio communications between a small non-contact integrated circuit (hereinafter referred to as "IC") device that is called a transponder and a predetermined reader/writer. The transponder stores various readable and/or writable data and has a communication function. Various uses for this RFID system have been attempted such as in production/logistics by attaching a transponder as tags to goods, in transportation fare collection and identification cards, and electronic monies, for instance.

In such a RFID system, communication distance from several millimeters to several meters can be realized, and it is classified roughly from short communication distance: close contact type, proximity type, neighborhood type and distant type. Furthermore, carrier frequencies of 125 kHz, 134 kHz, 4.9 MHz, 13.56 MHz, 2.45 GHz, and 5.8 GHz are generally used in the RFID system. The carrier frequency of the short wave band 13.56 MHz has been standardized as ISO (International Organization For Standardization) 14443 and is becoming widespread.

Moreover, such a RFID system is classified roughly into two systems: an electromagnetic induction system and a radio wave system according to a data transmission method. The electromagnetic induction system transmits data on the magnetic flux produced from a reader/writer, and is mainly used for a short wave band under 13.56 MHz. This electromagnetic induction method has advantages such as it can be used under bad circumstances because it is less susceptible to rain or dust; it has a wide antenna directionality; it covers wide ranges of transmission; and it has an excellent permeability to non-conductive materials. On the other hand, the radio wave method transmits data on a radio wave generated from a reader/writer, and it is mainly used for high career frequencies. This electric wave method has advantages such as having a long communication distance compared with the electromagnetic induction method; having an antenna directivity; and it is easy to define the range of transmission.

The transponder operating in the electromagnetic induction method transmits and receives necessary voltage for operation and data by forming a parallel resonant circuit so as to convert magnetic energy to voltage efficiently (for example, see Japanese Patent Publication No. 3064840 and Japanese Patent Publication No. 3421334). Therefore, this kind of transponder often forms the resonant circuit with the loop antenna and the capacitor connected with the loop antenna in parallel so as to transmit and receive necessary voltage for operation and data. Basically, as shown in FIG. 14, the transponder has a circuit configuration in which an IC chip 103 is connected with a resonant circuit having an antenna coil 101 and a capacitor 102 disposed in parallel for tuning.

An internal type capacitor embedded in the IC chip 103 has been realized as the capacitor 102 to form the resonant circuit like this in addition to an external type capacitor connected to the IC chip 103 as shown in FIG. 14. Furthermore, a film capacitor type mounted on the antenna substrate has been suggested.

However, there are problems such as increasing the number of the parts and increasing manufacturing costs due to wages for connection to the IC chip when an external type capacitor is used as a capacitor to form a resonant circuit in a transponder operating in traditional electromagnetic induction methods.

Moreover, there is a problem that the manufacturing cost increases due to the area of the IC chip increasing when the internal type capacitor embedded in the IC chip is used as a capacitor having a resonant circuit in conventional transponders.

Furthermore, manufacturing costs increase because a through hole needs to be made for connecting the front and rear sides of the substrate electronically because the double-sided board needs to be used as an antenna substrate when a film capacitor type is used as a capacitor having a resonant circuit in traditional transponders.

SUMMARY

The present disclosure is made with consideration of those situations, and is intended to provide an antenna circuit and a transponder with this antenna circuit capable of having desired characteristics by suggesting an extremely innovative method for forming a resonant circuit, with a low cost and a simple structure.

The present disclosure relates to an antenna circuit formed with at least an antenna coil on a front surface of a predetermined substrate made of a printed circuit board, and relates to a transponder having this antenna circuit, storing various readable and/or writable data, and having a communication function.

A method for forming a resonant circuit by using the double-sided board mounted antenna coil is provided.

In an embodiment, the antenna circuit to achieve the aim mentioned above is provided in a transponder that stores various readable and/or writable data and has a communication function, comprising at least an antenna coil formed on the surface of the predetermined substrate, an antenna conductor having a predetermined conductor pattern composing the antenna coil formed on the front surface of the substrate, and a sheet metal disposed on the rear surface of the substrate opposed to the front surface area of the substrate forming the antenna conductor on the rear surface of the substrate, forming a resonant circuit with floating capacitance produced by the sheet metal and the antenna conductor, and a slit provided in a part of the sheet metal, wherein the slit has a start end and a terminal end opened to the area at which the sheet metal does not exist.

In an embodiment, the antenna circuit can form the resonant circuit by the floating capacitance produced by the antenna conductor of the front surface opposed to the sheet metal and the sheet metal disposed on the rear surface of the substrate. At this time, in the antenna circuit pertaining to the embodiment, since a slit whose start and terminal ends are opened to the area at which the sheet metal does not exist is disposed in the part of the sheet metal, the antenna circuit is able to prevent the current from looping throughout the entire area at which the sheet metal is disposed and to lessen the loss by the eddy current flows on the sheet metal.

It is preferable that the sheet metal is disposed on the rear surface area of the substrate opposing to the front surface area of the substrate at which the antenna conductor is formed. In particular, the sheet metal preferably has a loop configuration, wherein the central part is cut out so as to dispose on the rear surface area of the substrate opposing to the front surface area of the substrate formed with the spiral-shaped antenna conductor. In this case, the slit is disposed so as to disconnect a part of the loop configuration. This can drastically lessen the loss happening due to eddy current flowing throughout the sheet metal in the antenna circuit pertaining to the embodiment. Furthermore, in the antenna circuit pertaining to the embodiment, the same result can be substantially obtained even where the other sheet metals are disposed with minute gaps so as to isolate electrically with the sheet metal in the inner periphery of the loop shaped sheet metal.

Moreover, plural slits can be disposed on the sheet metal. This brings preferable results only by changing the number of the slits in the antenna circuit of the embodiment.

Furthermore, as the other embodiment of the sheet metal, it can be thought to dispose the sheet metal on the rear surface of the substrate. In this case, the slit is disposed so as to divide the sheet metal into two or more. In the antenna circuit of the embodiment and even in such a structure, it can prevent the current from looping throughout the area at which the sheet metal is disposed and lessen the loss due to the eddy current flowing on the sheet metal.

Meanwhile, the double-sided printed circuit board having the predetermined electrical conductor foil on the front and rear surfaces is used as the substrate. In this case, the antenna conductor can be formed with the electrical conductor foil provided on the front surface of the substrate, and the sheet metal can be formed with the electrical conductor foil provided on the rear surface of the substrate. As described above, in the antenna circuit pertaining to the embodiment, simple manufacturing can be realized by forming the antenna coil as a printed antenna using inexpensive printed circuit board for a substrate. Accordingly, using the printed circuit board significantly reduces the overall cost of manufacturing.

The transponder according to this embodiment, so as to achieve the above mentioned purpose, is a transponder that stores various readable and/or writable data and has a communication function. The transponder according to this embodiment includes an antenna circuit having at least an antenna coil on the surface of the predetermined substrate. The antenna circuit comprises an antenna conductor having a predetermined conductor pattern composing the antenna coil formed on the front surface of the substrate, a sheet metal disposed on the rear surface of the substrate opposed to the front surface area of the substrate forming the antenna conductor on the rear surface of the substrate; a resonant circuit by floating capacitance produced by the sheet metal and the antenna conductor, a slit provided in a part of the sheet metal, wherein the slit has a start end and a terminal end opened to the area at which the sheet metal does not exist, and an IC chip mounted on the antenna circuit.

In the transponder according to an embodiment of the present application, a resonant circuit is formed by the floating capacitance produced by the antenna conductor of the front surface and the sheet metal disposed on the rear surface of the substrate. Furthermore, in the transponder pertaining to the embodiment, since a slit of which the start end and the terminal end are opened to the area at which the sheet metal does not exist is disposed in the part of the sheet metal, it can prevent the current from looping throughout the entire area at which the sheet metal is disposed and it can lessen the loss by the eddy current flows on the sheet metal.

The embodiment stated above is capable of providing a resonant circuit having desired characteristics while still having a low cost and a simple structure, i.e. a slit is provided with a part of a sheet metal disposed on the rear surface of the substrate.

Additional features and advantages are described herein, and will be apparent from, the following Detailed Description and the figures.

DETAILED DESCRIPTION

Hereinafter, specific embodiments will be described in detail with reference to the drawings.

Figure 1:
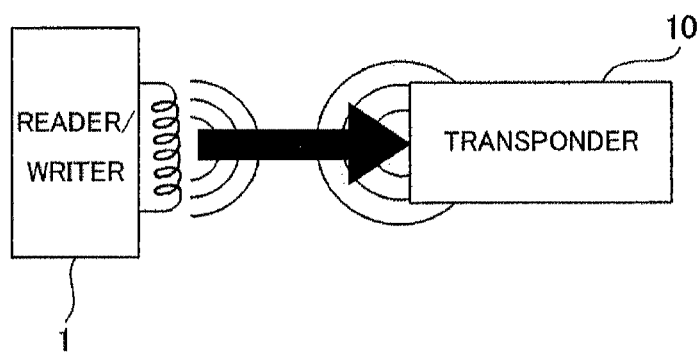
FIG. 1 is a block diagram showing a schematic configuration example of a RFID system wherein the transponder is used shown as an embodiment.

As shown in the FIG. 1, this embodiment is for a transponder 10 serving as a non-contact IC (Integrated Circuit) card that reads/writes data without contact by radio communication with the predetermined reader/writer 1, having a communication function, storing various readable and/or writable data, and being used in the RFID (Radio Frequency Identification) system. This transponder 10 incorporates an antenna coil (loop antenna) having a so-called printed antenna, in which an antenna conductor is patterned and formed on a predetermined resin substrate as a matrix, and this transponder 10 has a resonant circuit formed by an extremely innovative method.

The transponder 10 is formed inside with a circuit board mounting at least an antenna coil and an IC chip.

Figure 2:
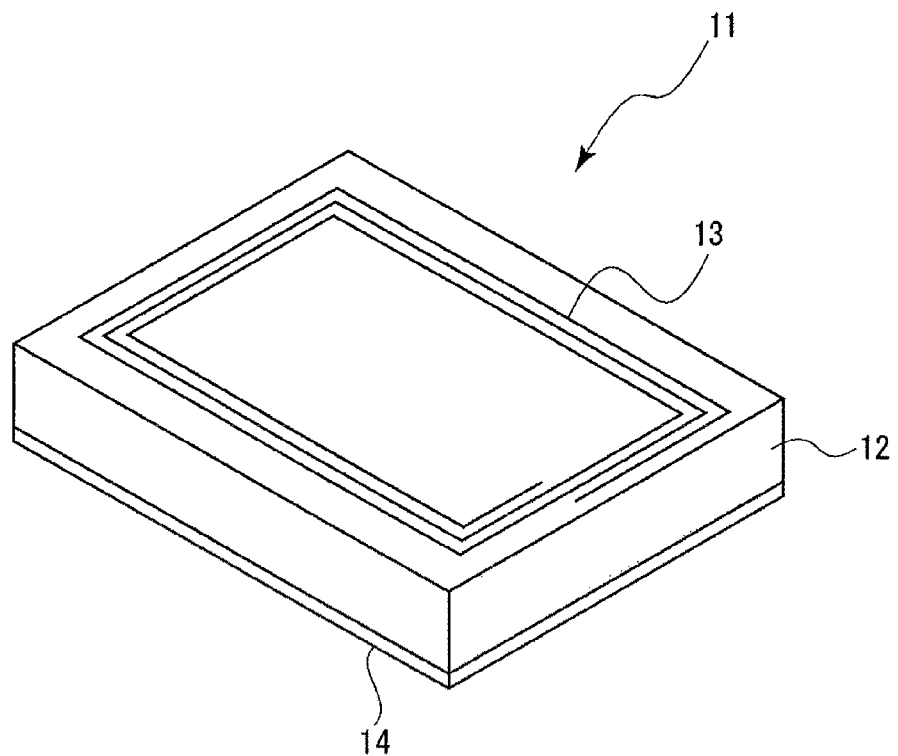
FIG. 2 is a plan view showing a basic circuit board used in the transponder shown as an embodiment.

FIG. 2 is a schematic perspective view showing a basic circuit board used in the transponder 10. This circuit board is formed by incorporating an IC chip integrating various members such as diode bridge, CPU (Central Processing Unit), ROM (Read Only Memory), and EEPROM (Electrically Erasable Programmable Read Only Memory) as a single semiconductor chip in order to realize a function of transponder for an antenna circuit 11 having at least an antenna conductor 13 formed with a predetermined conductor pattern forming the antenna coil on the surface of a predetermined substrate 12 in which the predetermined electrical conductor foil, such as copper foil, is provided on both sides of the predetermined insulating support.

With the antenna circuit 11, the main surface of the antenna circuit, for example, is formed in a rectangular shaped card. This antenna circuit 11 can be formed with any kind of material if it is generally used as a substrate of the printed circuit board. Specifically, the antenna circuit 11 is formed with a so-called rigid substrate having the predetermined electrical conductor foil, such as a copper foil, formed on both sides, such as e.g., a paper phenol substrate defined as NEMA (National Electrical Manufacturers Association) grade XXP, XPC and the like, a paper polyester substrate defined as NEMA grade FR-2, a paper epoxy substrate defined as NEMA grade FR-3, a glass paper composite epoxy substrate defined as NEMA grade CEM-1, a glass unwoven paper composite epoxy substrate defined as NEMA grade CHE-3, a glass fabric epoxy substrate defined as NEMA grade G-10, and a glass fabric epoxy substrate defined as NEMA grade FR-4. It is to be noted that the glass fabric epoxy substrate (FR-4) having less hygroscopicity, less change in size, and self-anti-inflammatory property is most desirable among these.

The antenna circuit 11 is formed by the antenna conductor 13 as an emitting electrode, and the antenna conductor 13 is exposed and formed on the surface by photo-etching the electrical conductor foil of the one surface (hereinafter called the front surface) with respect to the electrical conductor foil disposed on each side of the substrate 12. Specifically, in the antenna circuit 11, the spiral-shaped antenna conductor 13 is formed on the front surface of the substrate 12. In addition, FIG. 2 shows a structure in which the spiral-shaped antenna conductor 13 is formed in winding patterns along each edge of the substrate 12. Any antenna pattern by such antenna conductor 13, however, can be used as long as it functions as an antenna coil. A spiral-shaped pattern wound in a substantially concentric fashion can be used.

In the antenna circuit 11 formed by manufacturing the substrate 12 including the double-sided board like this, the inventor of the present application conceived utilizing an electrical conductor foil 14 disposed on the rear surface opposite to the front surface at which the antenna conductor 13 is formed, as a substitute structure for the conventional capacitors such as, e.g. an external type, an IC-equipped type, and film capacitor type, which form a conventional resonant circuit.

More specifically, the desired resonant condition is not met when L-component of the antenna coil becomes small due to using a broad conductor pattern in order to reduce the conductor loss in the antenna coil. Thus, the inventor of the present application considered earning C-component as a solid pattern from the electrode in the rear surface of the substrate as much as possible in order to make up L-component. The forming method of the resonant circuit which the embodiment suggests is conceived from this kind of view, and forms the resonant circuit by a floating capacitance produced by a sheet metal on the rear surface and the antenna conductor on the front surface of the antenna circuit.

Figure 3:
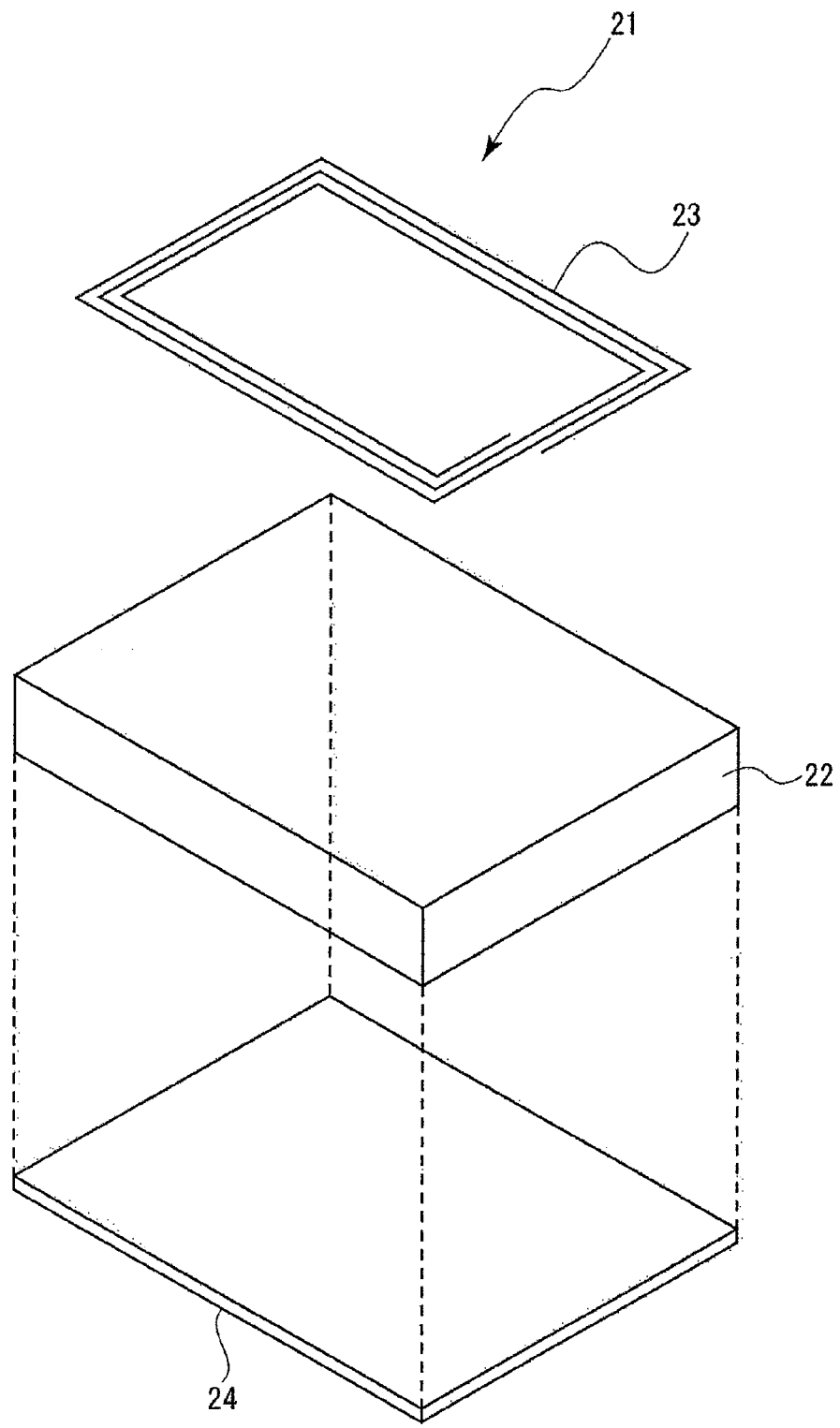
FIG. 3 is an exploded perspective view of the antenna circuit including a sheet metal allover the rear surface of the substrate.

Herein, as a sheet metal disposed on the rear surface of the substrate of the antenna circuit, as stated above, since it is desirable to have a solid pattern as much as possible, it can be thought that the sheet metal is disposed allover the rear surface. That is, as shown by an exploded perspective view in FIG. 3, an antenna circuit 21 includes a sheet metal 24 on the rear surface of a substrate 22 as well as an antenna conductor 23 on the front surface side of the substrate 22, wherein the substrate 22 is a double-sided board.

Figure 4:
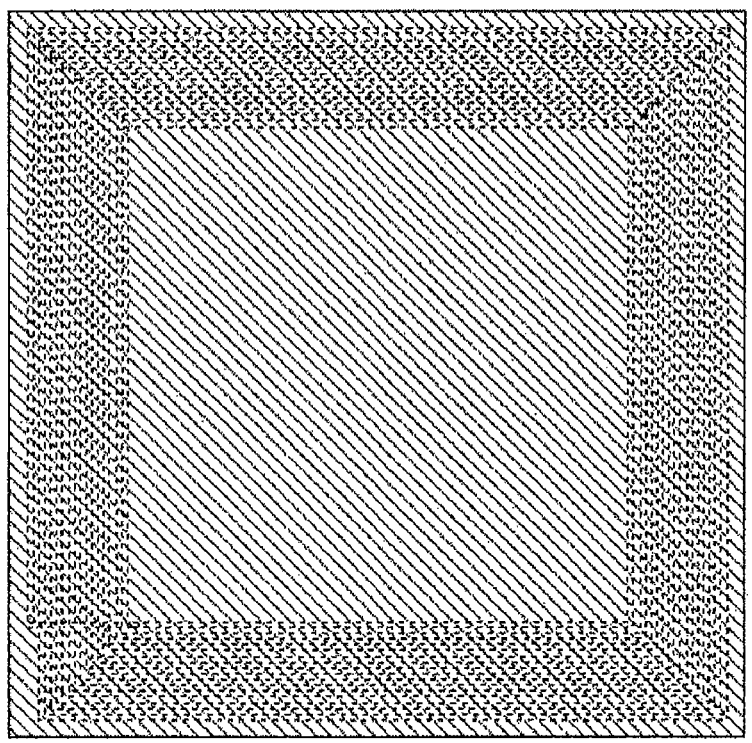
FIG. 4(a) shows a model of the antenna circuit used in a simulation for the aspect shown in FIG. 3.
FIG. 4(b) is a distribution chart showing a current distribution as the result of simulation where using the model shown in FIG. 4(a)
FIG. 4(c) shows a frequency characteristics as the result of simulation where using the model shown in FIG. 4(a)
Figure 4:
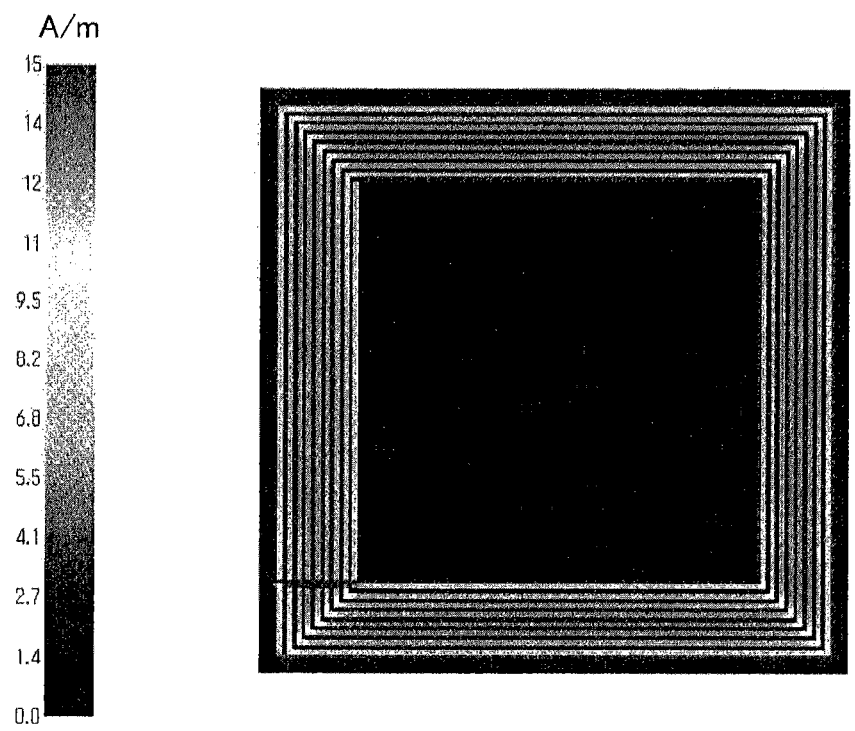
Figure 4:
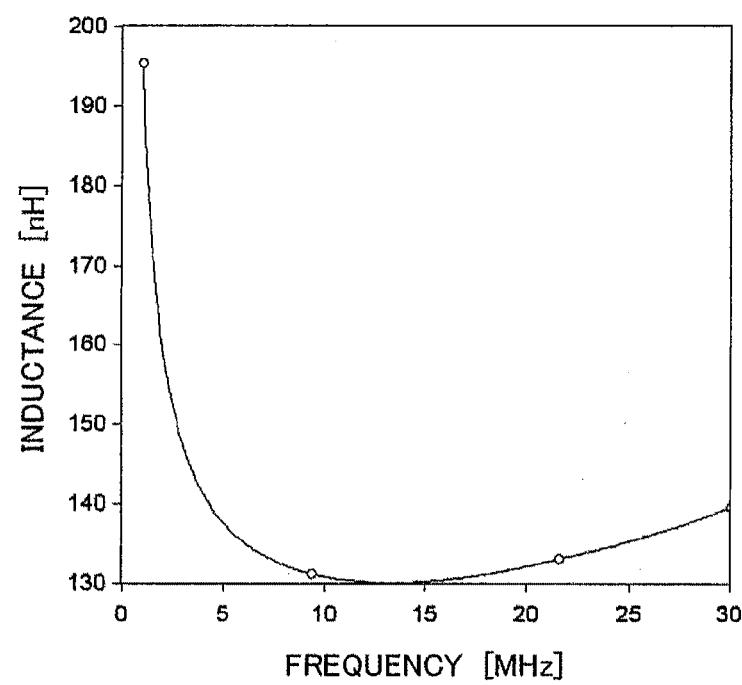

The inventor of the present application carried out a simulation for this kind of antenna circuit, and studied about the current distribution that flows in the sheet metal and the frequency characteristics. Specifically, the simulation was carried out using the square-shaped sheet metal as shown by a shaded area in FIG. 4(a), and an antenna circuit having a spiral-shaped antenna conductor that is wound along each edge of the sheet metal as shown by a dashed line in FIG. 4(a), as a model. In the result, the current distribution was, as shown in FIG. 4(b), that eddy current was generated allover the square-shaped sheet metal, and the frequency characteristics, as shown FIG. 4(c), indicates grossly reduced inductance due to increased loss caused by eddy current flowing in the sheet metal as the frequency is increased.

Figure 5:
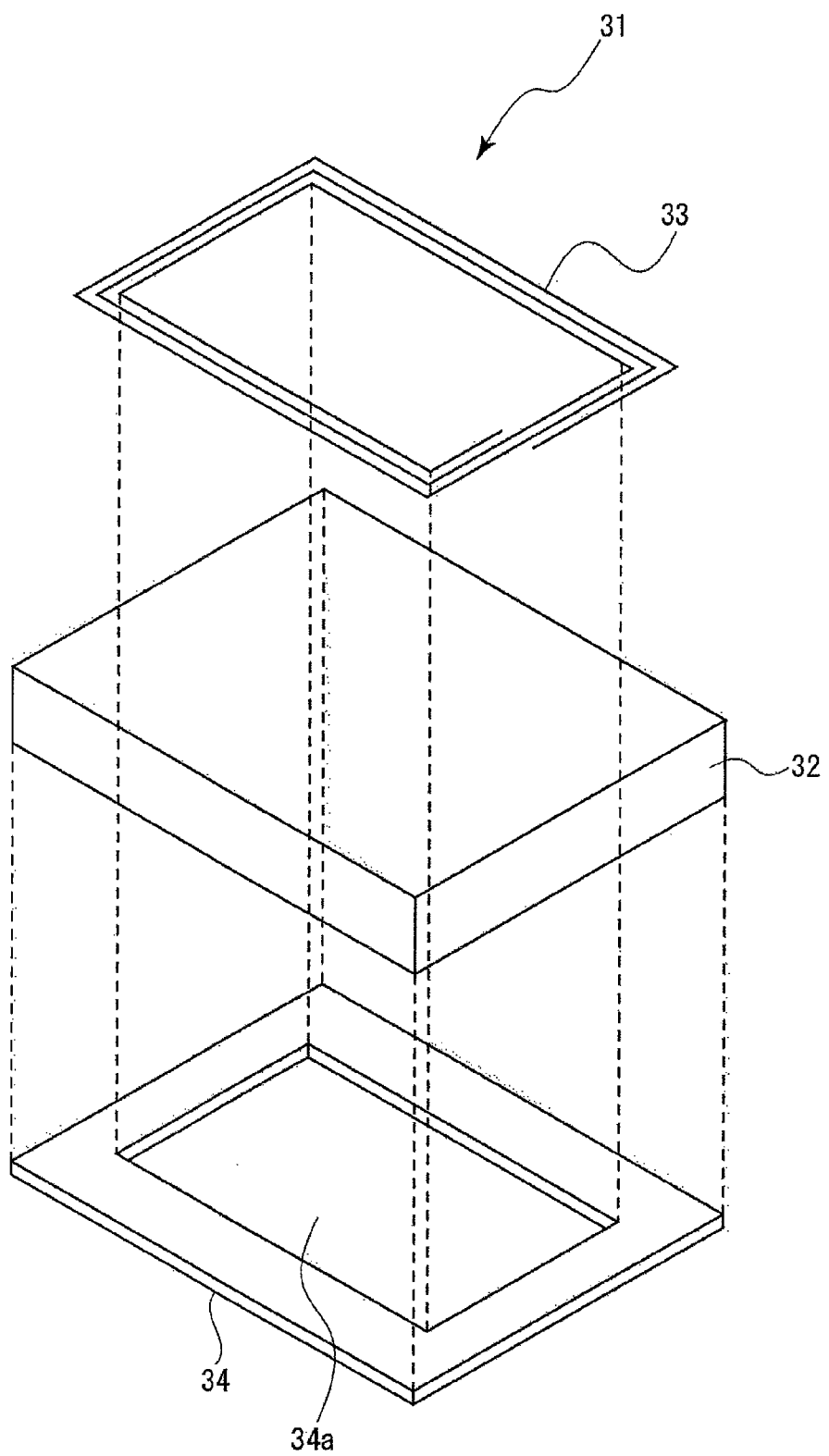
FIG. 5 is an exploded view showing an antenna circuit having a sheet metal on the rear surface area of the substrate opposing to the front surface area of the substrate having an antenna conductor.

Additionally, in order to form a parallel resonant circuit by L-component and C-component and to prevent the eddy current from generating allover the rear surface of the substrate at which the sheet metal is disposed, as shown by an exploded perspective view in FIG. 5, the inventor of the present application conceived an antenna circuit 31. The antenna circuit 31 includes a sheet metal 34 solely on the rear surface area of a substrate 32 opposed to the front surface area of the substrate 32 formed with an antenna conductor 33. The antenna circuit 31 is also formed with the antenna conductor 33 by manufacturing the front surface side of the sheet metal of the front surface side and rear surface side of the sheet metal provided on the substrate 32 having the double-sided board, such that the sheet metal is not provided allover the rear surface of the substrate 32. In other words, the inventor of the present application conceived the antenna circuit 31 having a loop configuration in which a through hole 34a is provided by cutting out a central part of the sheet metal for the sheet metal 34.

Figure 6:
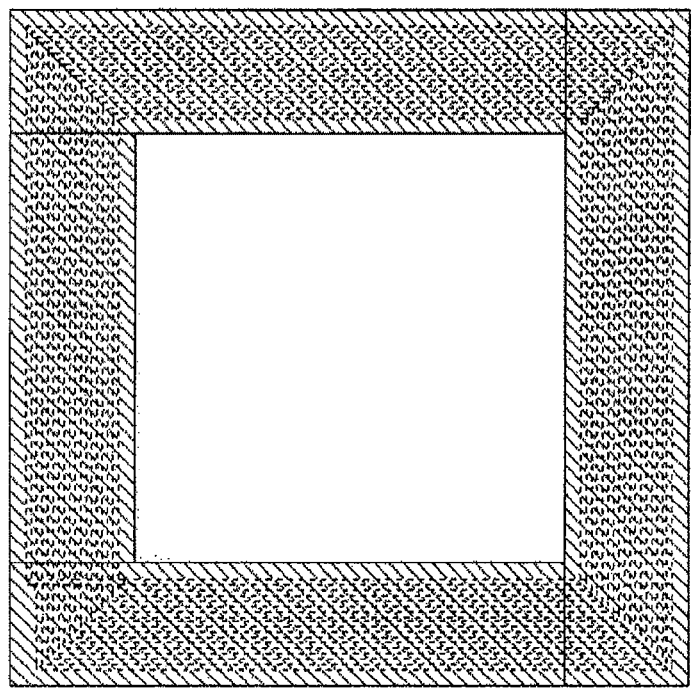
FIG. 6(a) shows a model of the antenna circuit used in a simulation for the aspect shown in FIG. 5.
FIG. 6(b) is a distribution chart showing a current distribution as the result of simulation where using the model shown in FIG. 6(a)
FIG. 6(c) shows a frequency characteristics as the result of simulation where using the model shown in FIG. 6(a)
Figure 6:
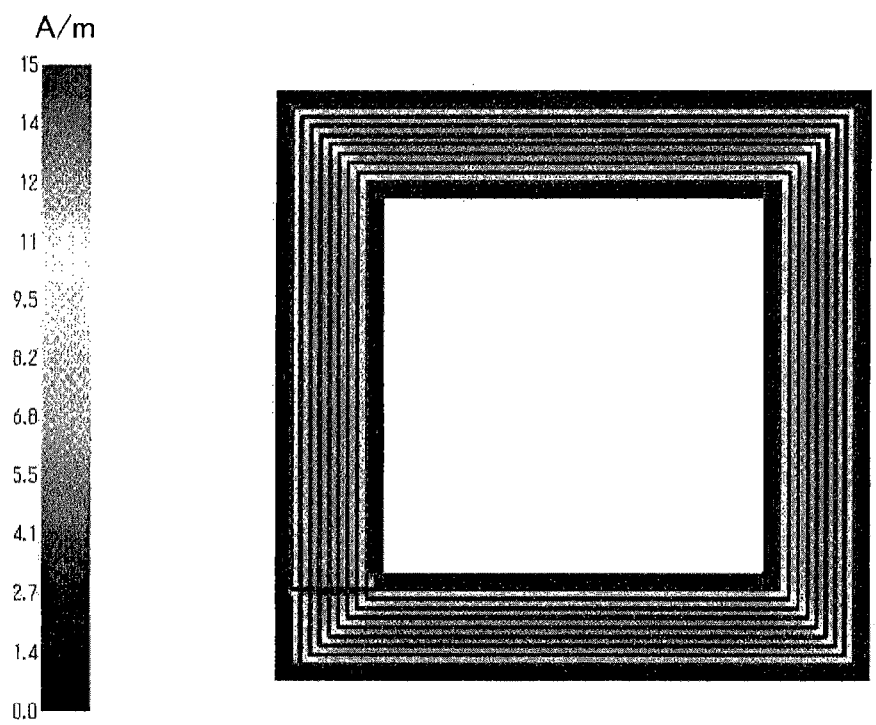
Figure 6:
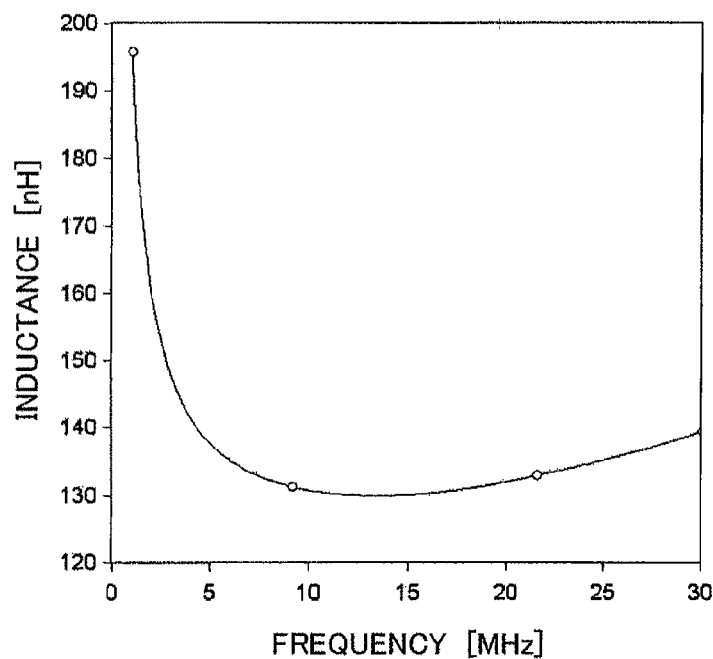

A simulation was carried out about this kind of antenna circuit and studied the current distribution flowing on the sheet metal and the frequency characteristics. Specifically, as shown by a shaded area in FIG. 6(a), the simulation was carried out using the sheet metal having a loop configuration and, as shown by a dashed line in FIG. 6(a), the antenna circuit including the spiral-shaped antenna conductor wound along each edge of the sheet metal as a model. In this case again, as FIG. 6(b) shows, the current distribution indicates that eddy current is generated allover the sheet metal having a loop configuration, and as FIG. 6(c) shows, the same frequency characteristics is substantially obtained though the inductance is slightly larger compared to the result shown in FIG. 4(c).

As apparent from the results of these simulations, it is hard to obtain the desired Q-value by merely disposing the sheet metal so as to increase the floating capacitance since the performance of the antenna coil significantly decreases, especially in the widely used short wave band (13.56 MHz).

Figure 7:
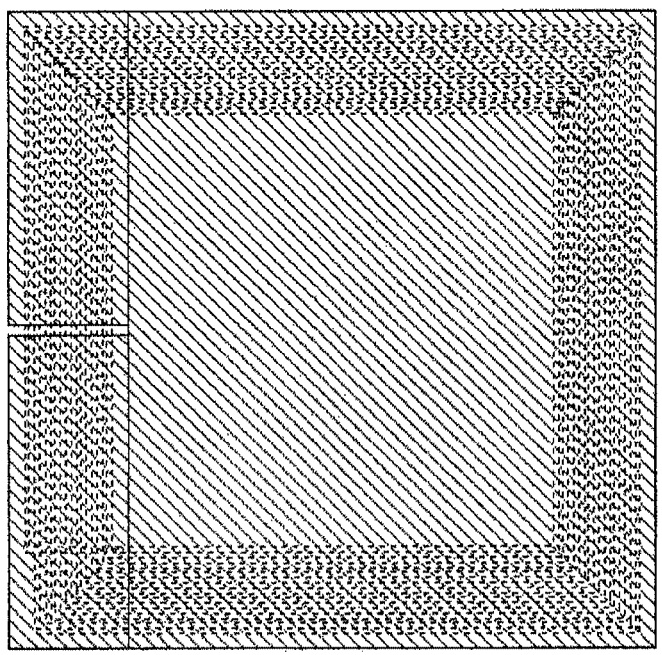
FIG. 7(a) shows a model of the antenna circuit used in a simulation carried out for the antenna circuit comprising a notch-like slit in a part of a square-shaped sheet metal.
FIG. 7(b) is a distribution chart showing the current distribution as the result of simulation where using the model shown in FIG. 7(a)
FIG. 7(c) shows a frequency characteristics as the result of simulation where using the model shown in FIG. 7(a)
Figure 7:
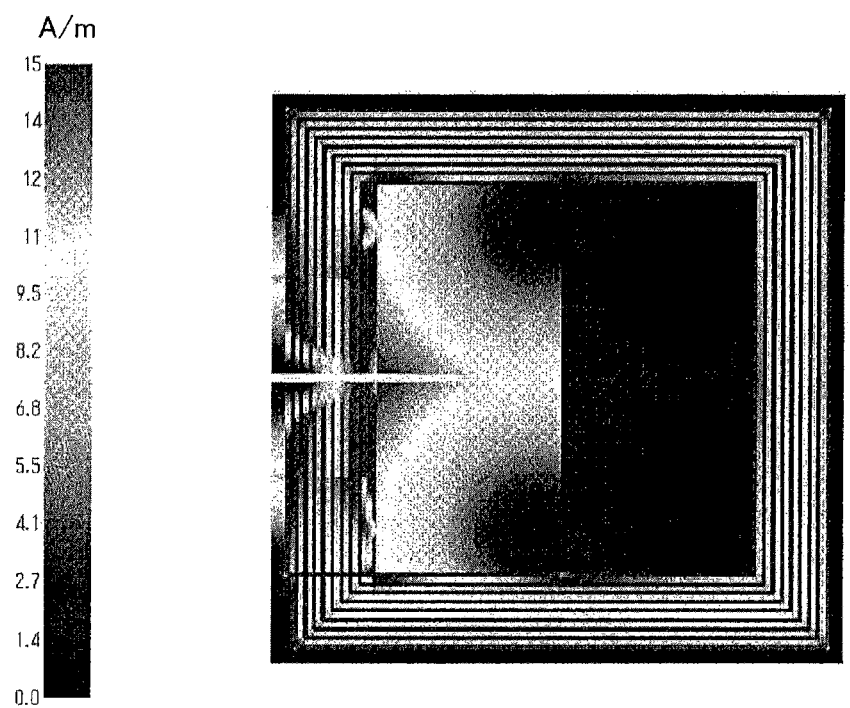
Figure 7:
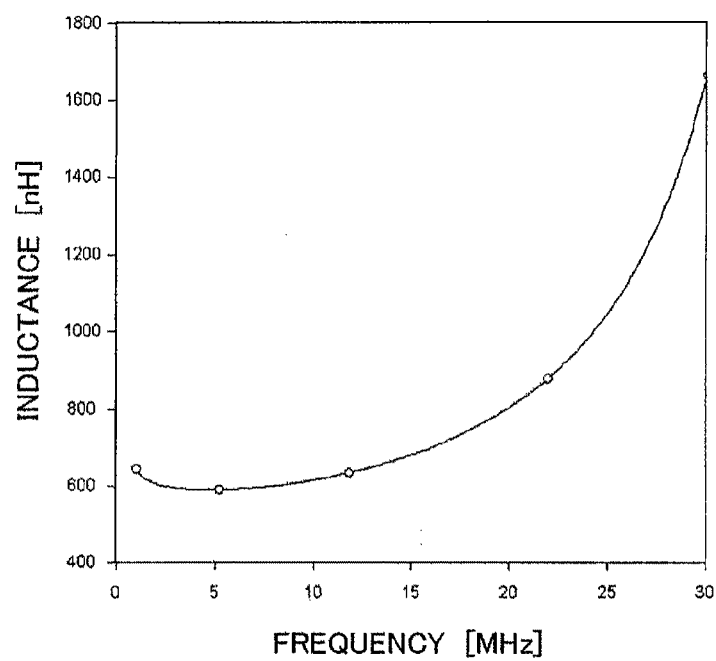

Herein, eddy current causes a trigger for deterioration of the characteristics. Consequently, to avoid eddy current by partially blocking the current flows on the sheet metal, a simulation was carried out using an antenna circuit comprising a notch-like slit in a part of a square-shaped sheet metal as a model, as shown by a shaded area in FIG. 7(a). However, as FIG. 7(b) shows, the current distribution of this time remains the same, that is only the current flows around the part of the slit, but eddy current still generates allover the sheet metal. Furthermore, as FIG. 7(c) shows, the frequency characteristics do not satisfy the performance as an antenna coil although the inductance becomes larger compared to the result shown in FIG. 4(c).

As is clear from the result of this simulation, it is hard to avoid the generation of eddy current only by partially blocking the current flowing on the sheet metal. Therefore, it is necessary to structure the antenna circuit so that the current does not loop allover the area at which the sheet metal is disposed.

Figure 8:
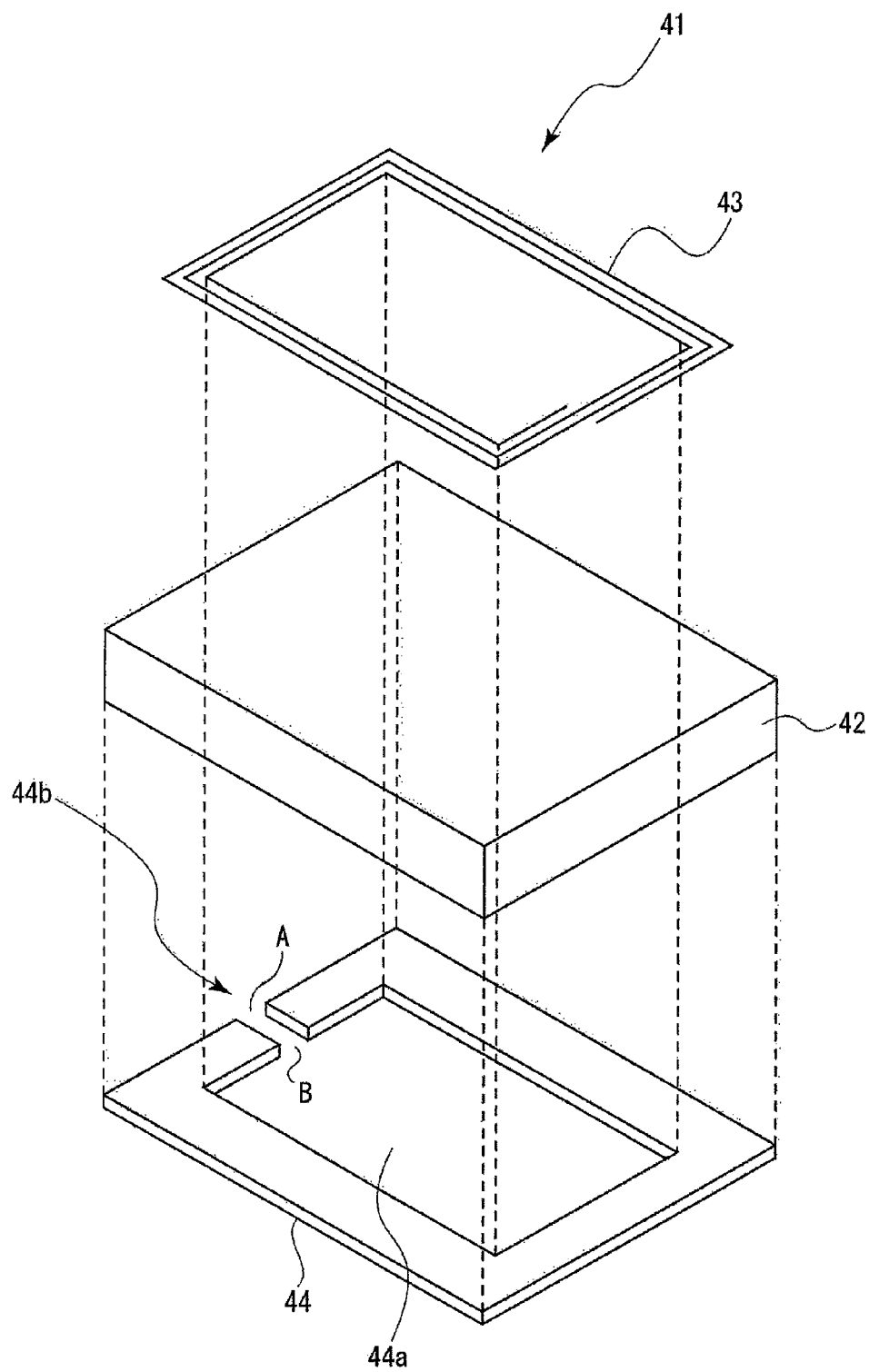
FIG. 8 is an exploded perspective view showing the antenna circuit having a sheet metal on only the rear surface area of the substrate opposed to the front surface area of the substrate having an antenna conductor, and having a slit of which the start end and terminal end are opened to the area at which the sheet metal does not exist.

Consequently, an antenna circuit 41 was configured by forming an antenna conductor 43 by manufacturing the front surface side of the sheet metal of the front surface side and rear surface sides of the sheet metal provided on a substrate 42 having double-sided board as shown by the exploded perspective view of FIG. 8. A sheet metal 44 having a through hole 44a provided by cutting out the central part of the sheet metal is disposed on the rear surface area of the substrate 42, opposed to the front surface area of the substrate 42 having the antenna conductor 43. Moreover, by providing a slit 44b of which the start end A and the terminal end B are open to the area at which the sheet metal 44 does not exist, a structure in which the current does not loop allover the area at which the sheet metal is disposed is realized.

In addition, the slit 44b has a configuration of which both of the start end A and the terminal end B are open to the area at which the sheet metal 44 does not exist. The reason why the slit has such a configuration is to eliminate a slit of which one end is closed by contacting the sheet metal such as a notch-like slit mentioned above, or a slit of which both ends are closed by drilling inside of the sheet metal.

In this kind of the antenna circuit 41, the current flows along the sheet metal 44 having a loop configuration. However, it is expected that the current will be blocked at the part of the slit 44b and will not loop since the slit 44b is disposed in order to disconnect a part of the loop configuration.

Figure 9:
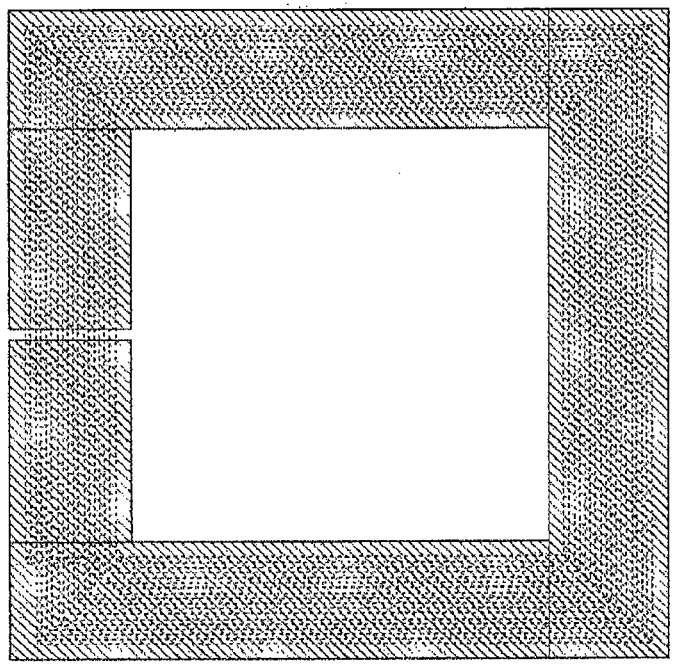
FIG. 9(a) shows a model of the antenna circuit used in the simulation for the aspect shown in FIG. 8.
FIG. 9(b) is a distribution chart showing the current distribution as the result of simulation where using the model shown in FIG. 9(a)
FIG. 9(c) shows a frequency characteristics as the result of simulation where using the model shown in FIG. 9(a)
Figure 9:
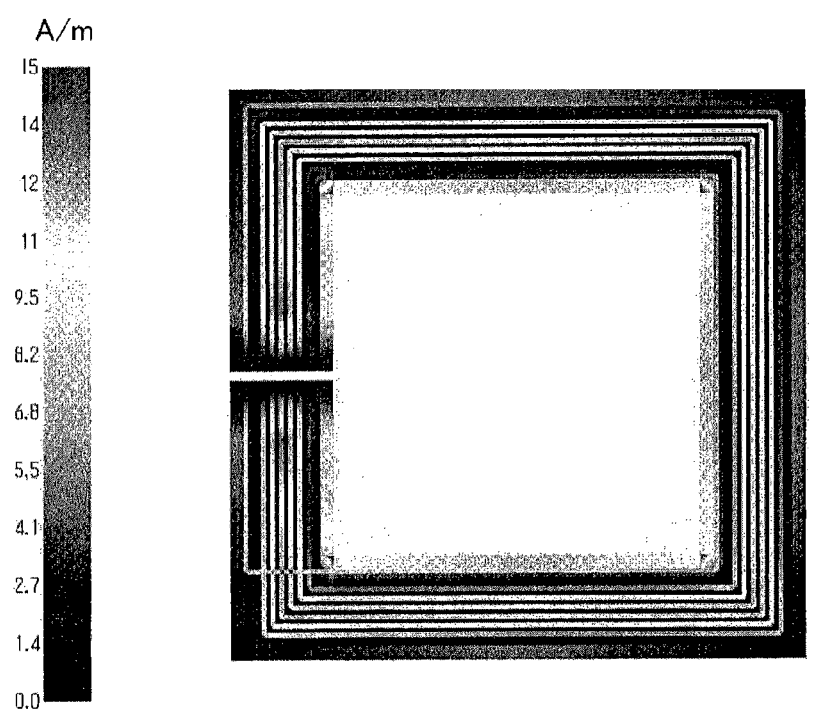
Figure 9:
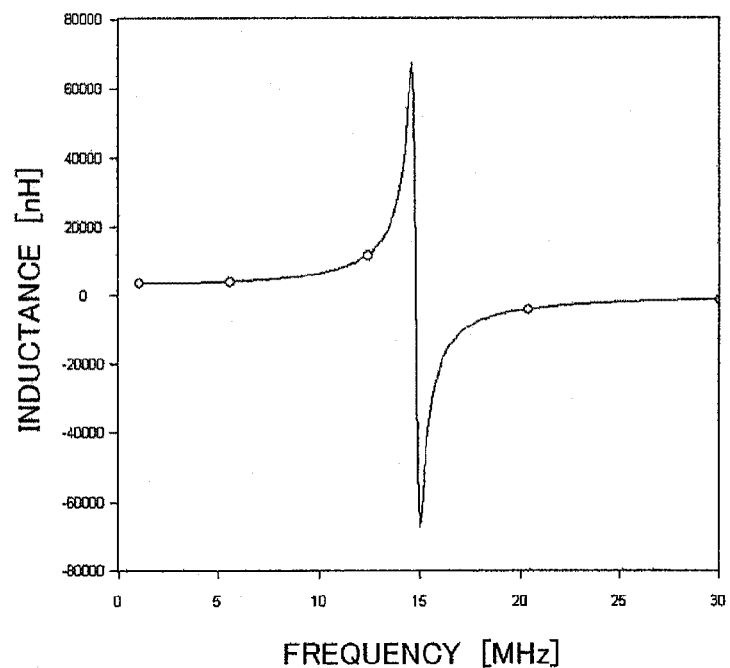

In fact, a simulation was carried out using the sheet metal having a loop configuration and a slit in a part as shown by a shaded area in FIG. 9(a), and an antenna circuit having a spiral-shaped antenna conductor that is wound along each edge of the sheet metal as shown by a dashed line in FIG. 9(a), as a model, and studied the current distribution that flows on the sheet metal and the frequency characteristics. In the result, the current distribution is that the current is blocked at the part of the slit as FIG. 9(b) shows, and this prevents the current from looping allover the area at which the sheet metal is disposed. Moreover, as FIG. 9(c) shows, the frequency characteristics become less deteriorated because self-resonance occurs when floating capacitance increases by the effect of the sheet metal, and a sharp peak is gained in the resonant frequency, and the loss by eddy current is small.

As is clear from the result of this simulation, it is effective to make the structure of the antenna circuit in which the current does not loop, but not to increase the floating capacitance by simply disposing the sheet metal. Therefore, the preferable antenna circuit 11 shown in FIG. 2 in the above is the antenna circuit comprising a sheet metal 14 on the rear surface area of the substrate 12 opposed to the area including the antenna conductor 13 on the front surface of the substrate 12 having a double-sided board and comprising a slit in a part of the sheet metal 14 preventing the current from looping allover the area including the sheet metal 14.

The antenna circuit 11 thus can form a resonant circuit capable of having desired characteristics even though having a simple structure. Furthermore, this antenna circuit 11 can reduce the number of parts because an external type capacitor is not necessary as a capacitor for the resonant circuit, reducing the number of parts and thereby reducing the manufacturing cost. Moreover, it can reduce the area of the IC chip because it is not necessary to incorporate any capacitor in the IC chip, reducing the area of the IC chip eventually leads to preventing the manufacturing cost from increasing in this antenna circuit 11. Additionally, this antenna circuit 11 does not need to electrically connect the front and rear sides of the double sided board through a through hole like the conventional film capacitors because the antenna conductor 13 formed on the front surface of the substrate 12 is solely connected with the IC chip, and it leads to reducing the cost of manufacturing.

Moreover, the antenna circuit 11 can be easily manufactured since the antenna coil is formed as a printed antenna by using a reasonable printed circuit board as the substrate 12. The total manufacturing cost can be significantly reduced because the antenna circuit 11 can be manufactured by using the manufacturing procedure of the printed circuit board.

In addition, the embodiment is not limited to the embodiment mentioned above. For example, in the above embodiment, a slit is provided in a part of the sheet metal having a loop configuration. However, the shape of the sheet metal does not matter if a slit of which the start end and terminal end are open to the area at which the sheet metal does not exist.

Figure 10:
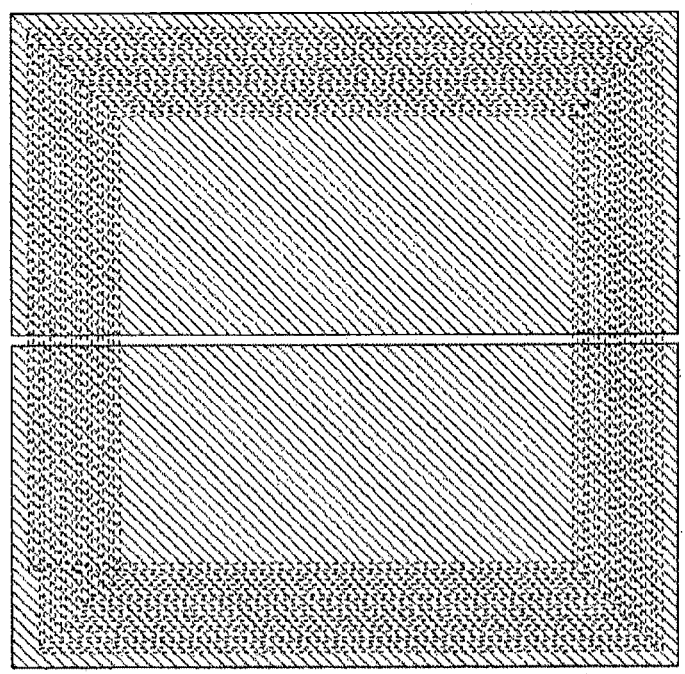
FIG. 10(a) shows a model of the antenna circuit used in the simulation carried out for the antenna circuit including the sheet metal divided in half, and a slit on the square-shaped sheet metal.
FIG. 10(b) is a distribution chart showing the current distribution as the result of simulation where using the model shown in FIG. 10(a)
FIG. 10(c) shows a frequency characteristics as the result of simulation where using the model shown in FIG. 10(a)
Figure 10:
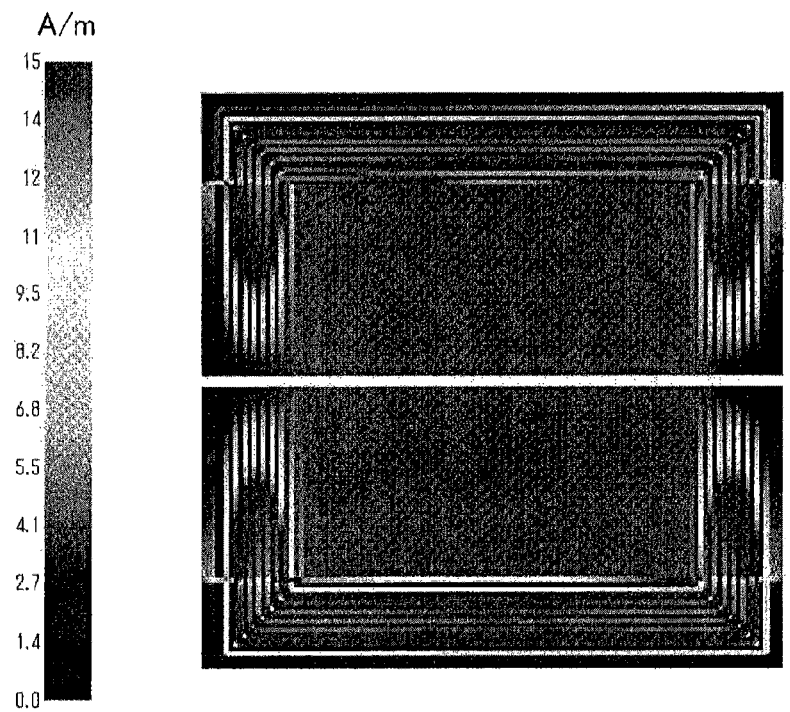
Figure 10:
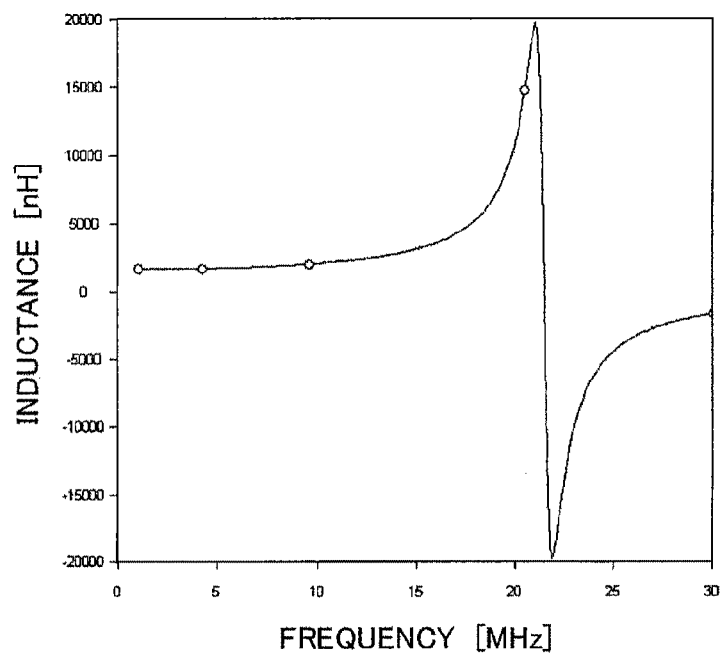

For example, a square-shaped sheet metal that is divided in half by providing a slit thereon can be used as the antenna circuit as shown by a shaded area in FIG. 10(a). FIG. 10(b) and FIG. 10(c) show the result of the simulation where the sheet metal is divided in half. In the result, as FIG. 10(b) shows, the current distribution was that one of the current distributions of the sheet metal does not have an influence on the other current distribution though eddy current occurs in each sheet metal divided in half. In other words, in the current distribution, the current is blocked at a part of the slit, and the slit prevents the current from looping allover the area at which these two sheet metals are disposed. Moreover, as FIG. 10(c) shows, the level of frequency characteristics is good enough to function as an antenna coil with having a self resonance by the sheet metal effect, although the frequency characteristics is less deteriorated compared to the result shown in FIG. 9(c).

Figure 11:
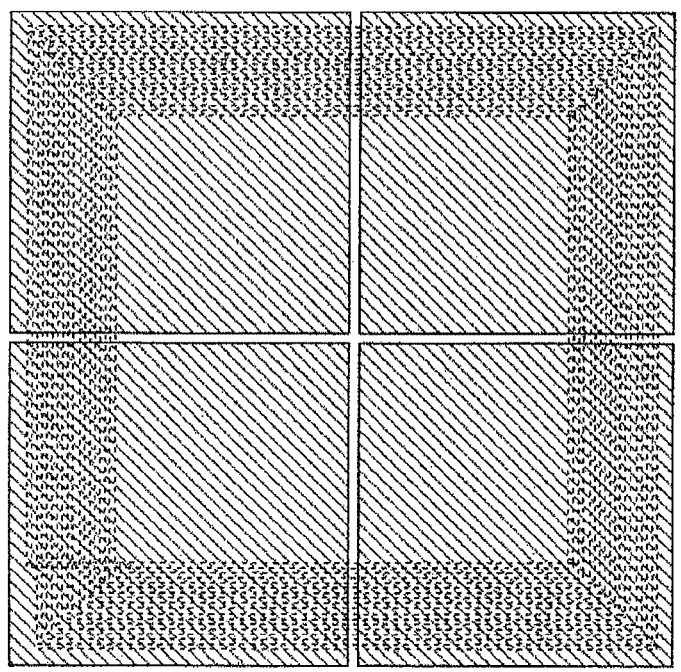
FIG. 11(a) shows a model of the antenna circuit used in a simulation carried out for an antenna circuit wherein the sheet metal is divided into quarters, and a slit is provided on the square-shaped sheet metal.
FIG. 11(b) is a distribution chart showing a current distribution as the result of simulation where using the model shown in FIG. 11(a)
FIG. 11(c) shows a frequency characteristics as the result of simulation where using the model shown in FIG. 11(a)
Figure 11:
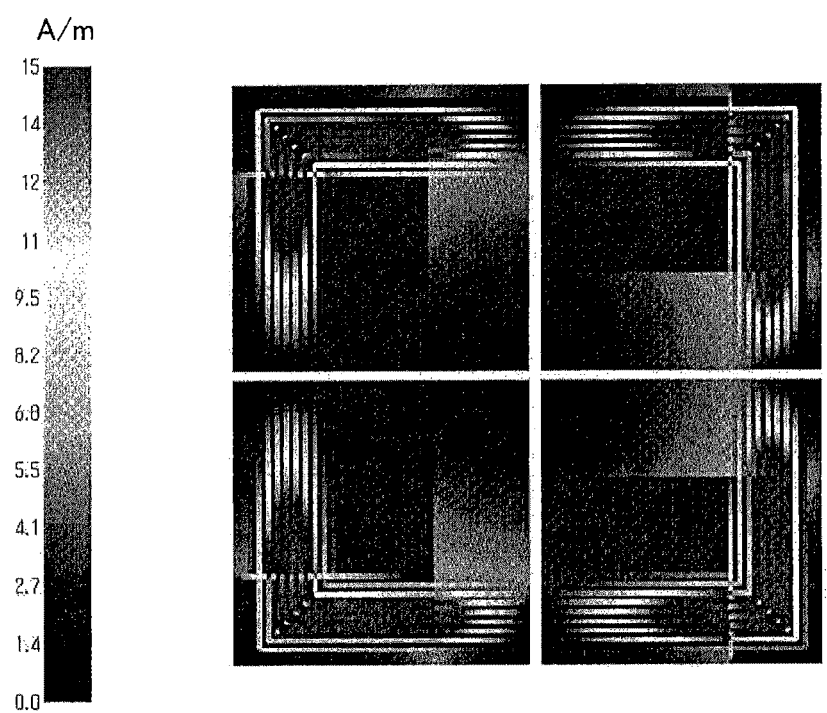
Figure 11:
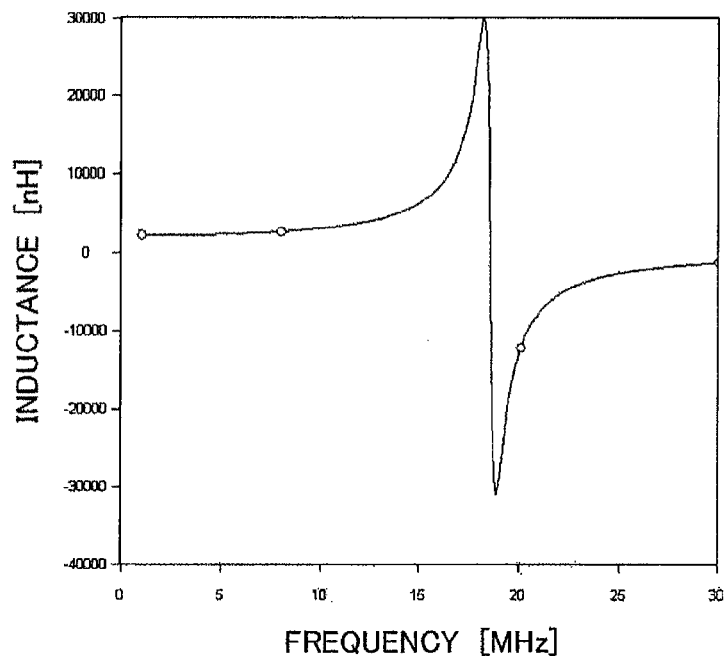

Furthermore, as shown by a shaded area in FIG. 11(a), the square-shaped sheet metal divided into quarters by providing a slit can be used as the antenna circuit. In this case, as shown in FIG. 11(b), although eddy current occurs in each sheet metal divided into quarters as is the case with the dual partitioning, the current distribution indicates that one of the current distributions of the sheet metal does not have an influence on the other current distributions and the current is prevented from looping allover the area at which four sheet metals are disposed. In addition, as shown in FIG. 11(c), the frequency characteristics are improved compared to the result shown in FIG. 10(c).

As stated above, as shown in FIG. 10(a) or FIG. 11(a), a slit can be provided in the sheet metal so as to divide the sheet metal into a plurality of sections.

Figure 12:
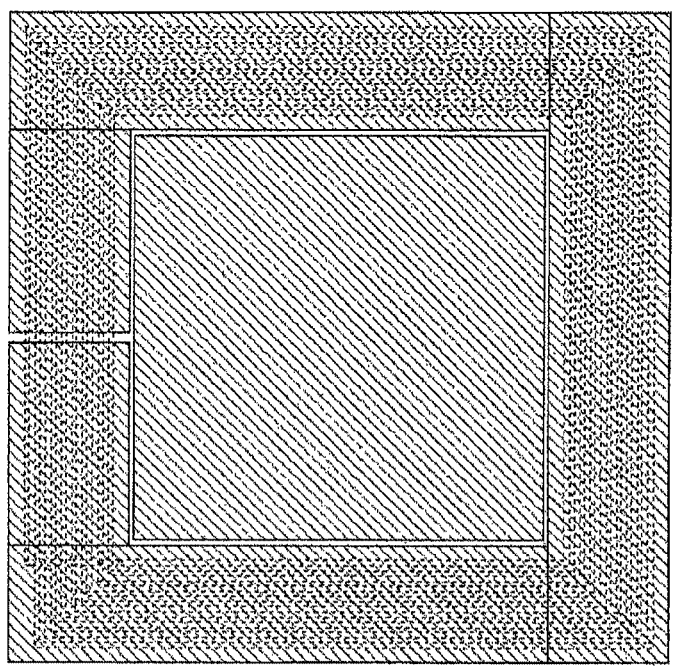
FIG. 12(a) shows a model of the antenna circuit used in a simulation carried out for the antenna circuit including a sheet metal having a square configuration in the inner periphery of the sheet metal having a loop configuration provided with a slit.
FIG. 12(b) is a distribution chart showing the current distribution as the result of simulation where using the model shown in FIG. 12(a)
FIG. 12(c) shows a frequency characteristics as the result of simulation where using the model shown in FIG. 12(a)
Figure 12:
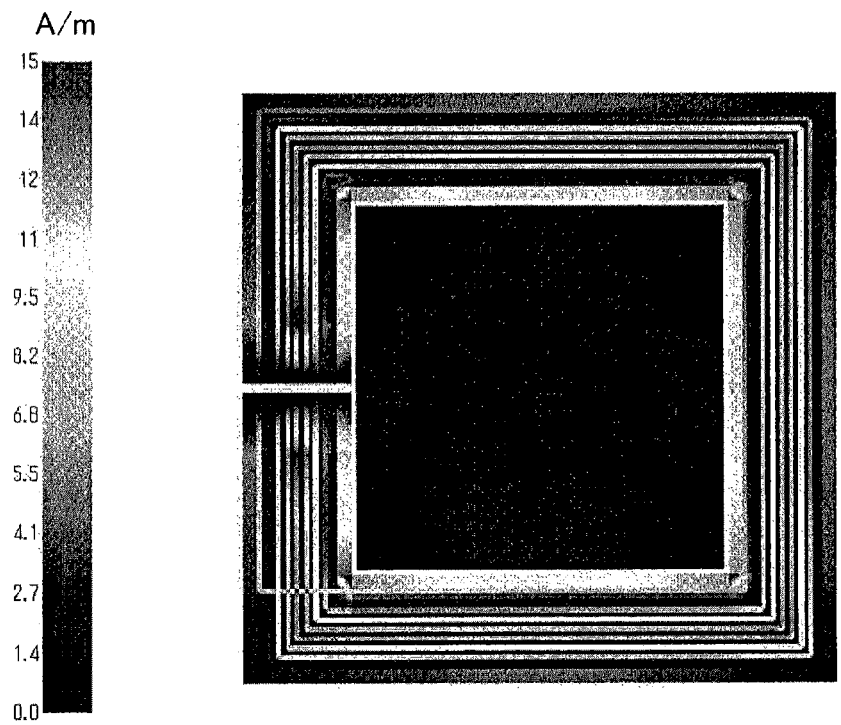
Figure 12:
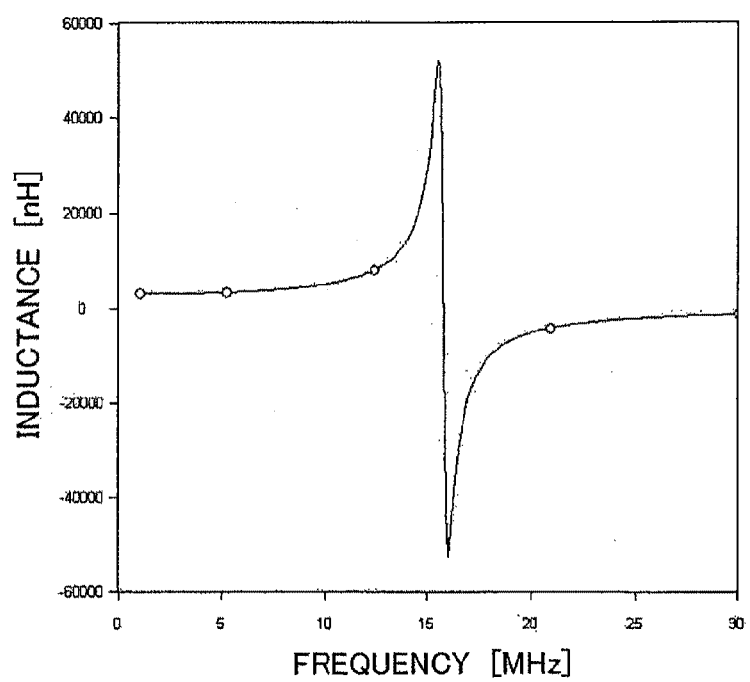

Moreover, as shown by the shaded area in FIG. 12(a), an antenna circuit can be used in which the other sheet metal is disposed with a minute gap to be isolated electrically with the sheet metal on the inner periphery part of the loop-shaped sheet metal as well as disposing a sheet metal having a loop configuration provided with a slit. In this case, as FIG. 12(b) shows, the current distribution indicates that the current is prevented from looping allover the area including two sheet metals having a loop configuration and a square configuration, although the current is induced at the edge of the square-shaped sheet metal disposed in the inner periphery. Moreover, as FIG. 12(c) shows, with regard to the frequency characteristics, self resonance occurs by the effect of the sheet metal and the level of the frequency characteristics is good enough to function as an antenna coil, even though disposing a sheet metal having a square configuration results in deterioration in the characteristics compared to the result shown in FIG. 9(c).

Figure 13:
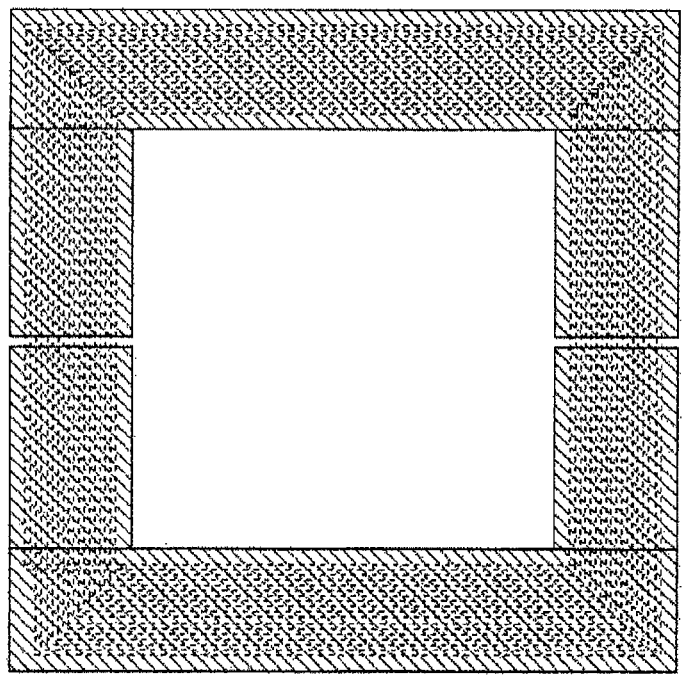
FIG. 13(a) shows a model of the antenna circuit that was used in a simulation for the antenna circuit used a sheet metal having a loop configuration and the slits in the two parts.
FIG. 13(b) is a distribution chart showing the current distribution as the result of simulation where using the model shown in FIG. 13(a)
FIG. 13(c) shows a frequency characteristics as the result of simulation where using the model shown in FIG. 13(a)
Figure 13:
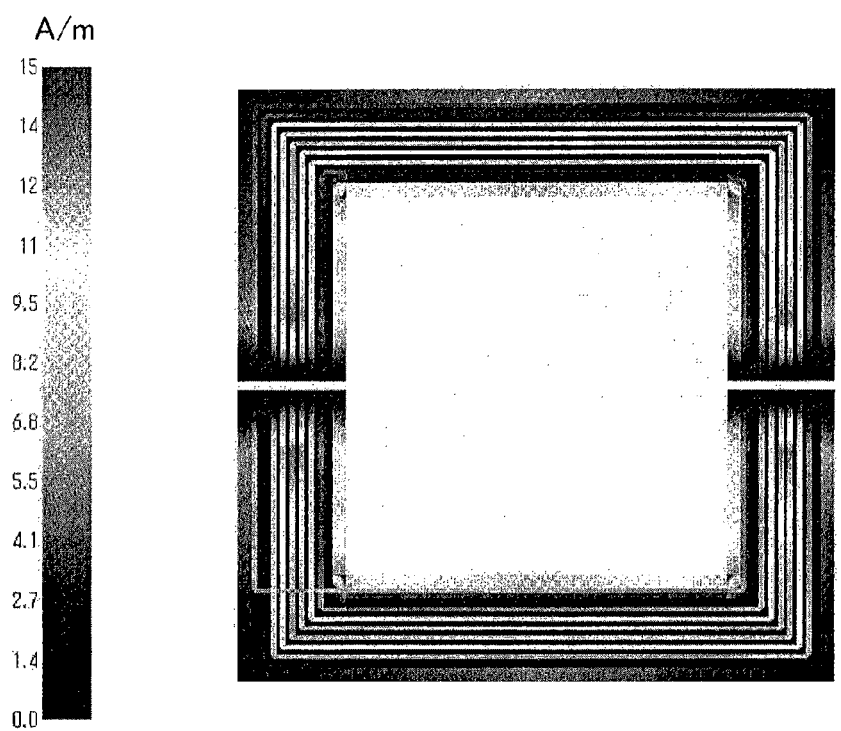
Figure 13:
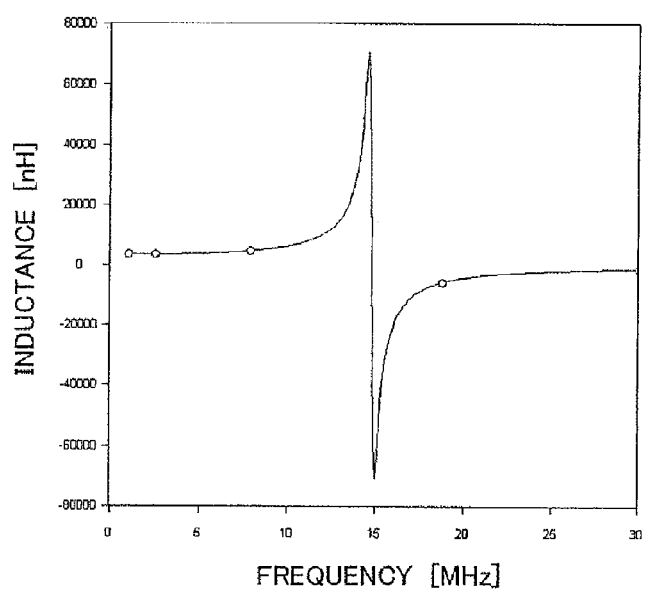
Figure 14:
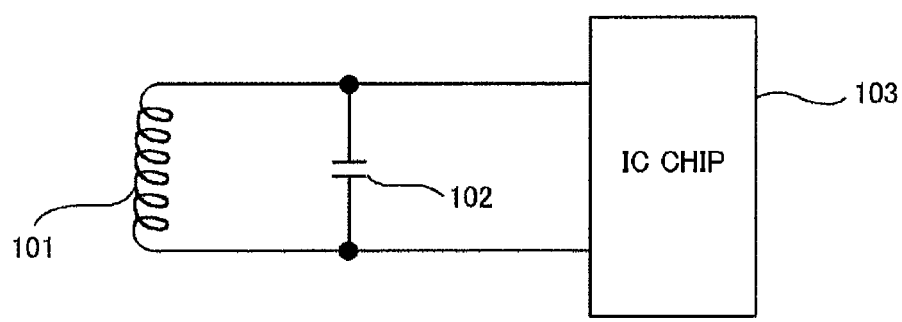
FIG. 14 is a block diagram showing a basic circuit configuration of the transponder.

Moreover, a plurality of slits can be provided in the sheet metal. FIG. 13(a) to FIG. 13(c) show the result of the simulation where using the sheet metal having a loop configuration provided with two slits. In addition, FIG. 13(a) shows a model of the antenna circuit used in the simulation, and the model of the antenna circuit comprising the sheet metal having a loop configuration provided with the slits in two parts is shown by a shaded area in FIG. 13(a). The spiral-shaped antenna conductor wound along each edge of the sheet metal is shown by a dashed line in FIG. 13(a). In the result, the current distribution shows that the current is blocked at a part of the slit and prevents the current from looping allover the area at which the sheet metal is disposed as shown in FIG. 13(b). Moreover, as shown in FIG. 13(c), the frequency characteristics are improved, even though slightly, compared to the result shown in FIG. 9(c).

As stated above, any configurations of the sheet metal can be applied as long as it was provided with a slit of which both the start end and the terminal end are open to the area at which the sheet metal does not exist. In addition, reducing the area of the sheet metal and increasing the number of the slits leads to decrease in the floating capacitance due to the decrease in the area of the sheet metal, although the entire loss of the current decreased. That is, there is a tradeoff relationship from the viewpoint of the characteristics. Therefore, in the antenna circuit, it is only necessary to change the configuration of the sheet metal or the number of the slits in accordance with the desired Q-value.

Moreover, in the above embodiment, although we set forth that the antenna coil was formed as a printed-antenna, the present application is not limited to this, and anything can be applied as long as functioning as an antenna coil.

In addition, although the transponder of the card type was used for the explanation in the embodiment mentioned above, the present application can be applied to other various configurations on the basis of the usage, not limited to the card type.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An antenna circuit provided in a transponder that stores various readable and/or writable data and has a communication function, the antenna circuit comprising:
   a substrate;
   an antenna conductor including an antenna coil formed in a predetermined conductor pattern on a front surface of the substrate;
   a first sheet metal on a rear surface of the substrate opposed to the front surface of the substrate, the first sheet metal having a loop shape with a through hole,
   wherein a slit is provided in the first sheet metal that cuts off a part of the loop shape, the slit extending from the through hole to an outside edge of the first sheet metal, and the through hole is surrounded by the first sheet metal except where the slit is provided in the first sheet metal; and a second sheet metal disposed on an inner peripheral part of the first sheet metal with a minute gap between the first sheet metal and the second sheet metal, wherein the second sheet metal is electrically isolated from the first sheet metal.

2. The antenna circuit according to claim 1, wherein the through hole is provided by cutting out a central part of the first sheet metal.

3. The antenna circuit according to claim 1, wherein the second sheet metal is disposed in the through hole of the first sheet metal.

4. The antenna circuit according to claim 1, wherein the first sheet metal is provided with a plurality of the slits.

5. The antenna circuit according to claim 1, wherein the substrate is a double-sided printed circuit board, wherein the antenna conductor is formed with an electric conductor foil provided on a front surface of the double-sided printed circuit board, and wherein the first sheet metal is formed with an electric conductor foil provided on a rear surface of the double-sided printed circuit board.

6. The antenna circuit according to claim 1, wherein a resonant circuit is formed by a floating capacitance produced by the first sheet metal and the antenna conductor.

7. A transponder that stores various readable and/or writable data and has a communication function, the transponder comprising:
an IC chip; and
an antenna circuit having the IC chip mounted thereon, the antenna circuit comprising:
a substrate;
an antenna conductor including an antenna coil formed in a predetermined conductor pattern on a front surface of the substrate; and
a first sheet metal on a rear surface of the substrate opposed to the front surface of the substrate, the first sheet metal having a loop shape in which a central part is cut out,
wherein a slit is provided in the first sheet metal that cuts off a part of the loop shape, the slit extending from the through hole to an outside edge of the first sheet metal, and the through hole is surrounded by the first sheet metal except where the slit is provided in the first sheet metal; and a second sheet metal disposed on an inner peripheral part of the first sheet metal with a minute gap between the first sheet metal and the second sheet metal, wherein the second sheet metal is electrically isolated from the first sheet metal.

* * * * *